(12) United States Patent
Tracy et al.

(10) Patent No.: US 8,456,827 B2
(45) Date of Patent: Jun. 4, 2013

(54) COMPUTER WITH MULTIPLE HARD DRIVES

(75) Inventors: Mark S. Tracy, Tomball, TX (US); Paul J. Doczy, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1131 days.

(21) Appl. No.: 11/940,182

(22) Filed: Nov. 14, 2007

(65) Prior Publication Data
US 2009/0052296 A1 Feb. 26, 2009

Related U.S. Application Data

(63) Continuation of application No. 11/829,926, filed on Jul. 29, 2007, now abandoned.

(51) Int. Cl.
*H05K 7/14* (2006.01)

(52) U.S. Cl.
USPC .................................. 361/679.33; 312/223.1

(58) Field of Classification Search
USPC ............. 361/679.26, 679.09, 679.08, 679.02, 361/679.01, 679.21, 679.4, 679.33, 679.59; 312/223.1–223.2; 369/75.11
See application file for complete search history.

(56) References Cited

U.S. PATENT DOCUMENTS

| | | | | |
|---|---|---|---|---|
| 4,742,478 A | * | 5/1988 | Nigro et al. | 361/679.09 |
| 5,187,643 A | * | 2/1993 | I-Shou | 361/679.37 |
| 6,040,979 A | * | 3/2000 | Homer | 361/679.37 |
| 6,178,084 B1 | * | 1/2001 | Shibasaki | 361/679.33 |
| 6,227,632 B1 | * | 5/2001 | Liu | 312/223.2 |
| 6,307,745 B1 | * | 10/2001 | Liebenow | 361/679.55 |
| 6,385,042 B1 | * | 5/2002 | Chen | 361/679.41 |
| 6,445,576 B1 | * | 9/2002 | Wooden et al. | 361/679.33 |
| 6,556,441 B2 | * | 4/2003 | Mohi et al. | 361/679.33 |
| 6,778,385 B2 | * | 8/2004 | Forlenza et al. | 361/679.4 |
| 7,423,868 B2 | * | 9/2008 | Mihara et al. | 361/679.33 |
| 2002/0101710 A1 | * | 8/2002 | Diaz | 361/685 |
| 2007/0253101 A1 | * | 11/2007 | Miyairi | 360/97.01 |

\* cited by examiner

*Primary Examiner* — Jayprakash N Gandhi
*Assistant Examiner* — Ingrid Wright

(57) ABSTRACT

One exemplary embodiment is a computer having a base and first and second hard disk drives enclosed in the base. The second hard disk drive is stacked on the first hard disk drive and is removable from the base.

19 Claims, 4 Drawing Sheets

COMPUTER WITH MULTIPLE HARD DRIVES

CROSS-REFERENCE TO RELATED APPLICATIONS

This application is a continuation of and claims the benefit of the filing date for U.S. patent application Ser. No. 11/829,926, filed on Jul. 29, 2007 now abandoned, which is hereby incorporated by reference in its entirety.

BACKGROUND

Notebook computers and other portable computing devices include a hard disk drive for storing data. Hard disk drives provide large amounts of storage capacity with relatively fast access times.

As the features on computing devices grow and the demand for smaller devices increases, computer designers are challenged to design faster and smaller computing devices with more memory. In some instances, a single hard disk drive cannot provide sufficient memory to meet the demands of users.

DETAILED DESCRIPTION

Exemplary embodiments are directed to systems, methods, and apparatus for utilizing multiple hard disk drives (HDDs) in a computing device. The multiple HDDs provide more storage capacity than a single HDD and are enclosed within the computing device while maintaining a thin form factor.

In one embodiment, a portable computing device includes two or more vertically stacked hard disk drives. For example, a first HDD connects to a system or motherboard with a first connector, and a second HDD is stacked on top of the first HDD. A second connector connects the second HDD to the first HDD and/or the motherboard.

A door provides access to the plural HDDs. For example, a single access door on a bottom surface of the portable computing device enables a user to remove one or more of the HDDs. In one exemplary embodiment, the door protrudes from the bottom surface of the portable computing device to provide a foot rest or tilt support for the portable computing device.

Exemplary embodiments include, but are not limited to, computers (portable and non-portable), laptops, notebooks, PDAs (personal digital assistants), communication devices (example, telephones), tablet personal computers, and other electronic devices and systems (whether portable or non-portable). For illustration, FIGS. 1 and 2A-2D show a notebook or laptop computer.

Figure 1:
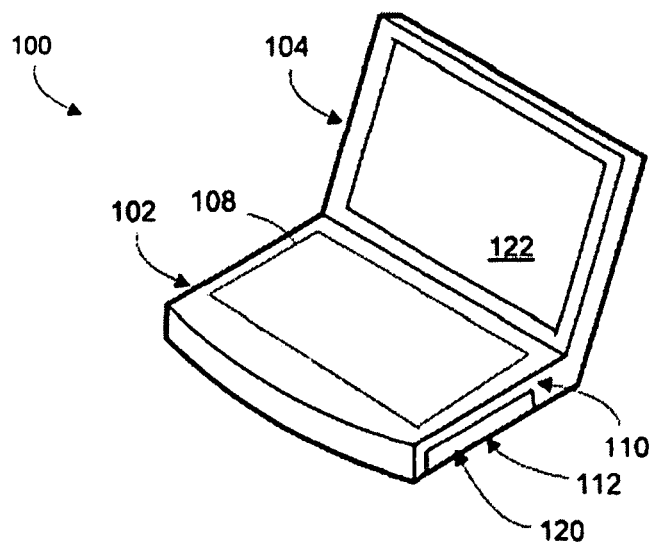
FIG. 1 is portable computing device in accordance with an exemplary embodiment.

FIG. 1 illustrates a notebook or laptop computer 100 comprising a base 102 pivotally connected to a display 104. The base 102 comprises a keyboard 108 and a generally rectangular or square body with an upper or top surface 110 and a lower or bottom surface 112 that is positionable on a support surface. By way of example, the base 102 houses and comprises one or more of a central processing unit (CPU), hard disk drive, memory, infrared ports, disk drives, PC card slots, batteries, universal serial bus (USB) ports, power connectors, monitor and display connectors, multi-bays, network connectors, CompactFlash card slots, and other input/output (I/O) ports, just to name a few examples. Many of these features are generally shown at 120.

The display 104 generally comprises a front surface with a screen 122, such as a backlit color liquid crystal display (LCD). Data is entered using, for example, a stylus, keyboard 108, user's finger, and/or voice activation, to name a few examples.

Figure 2A:
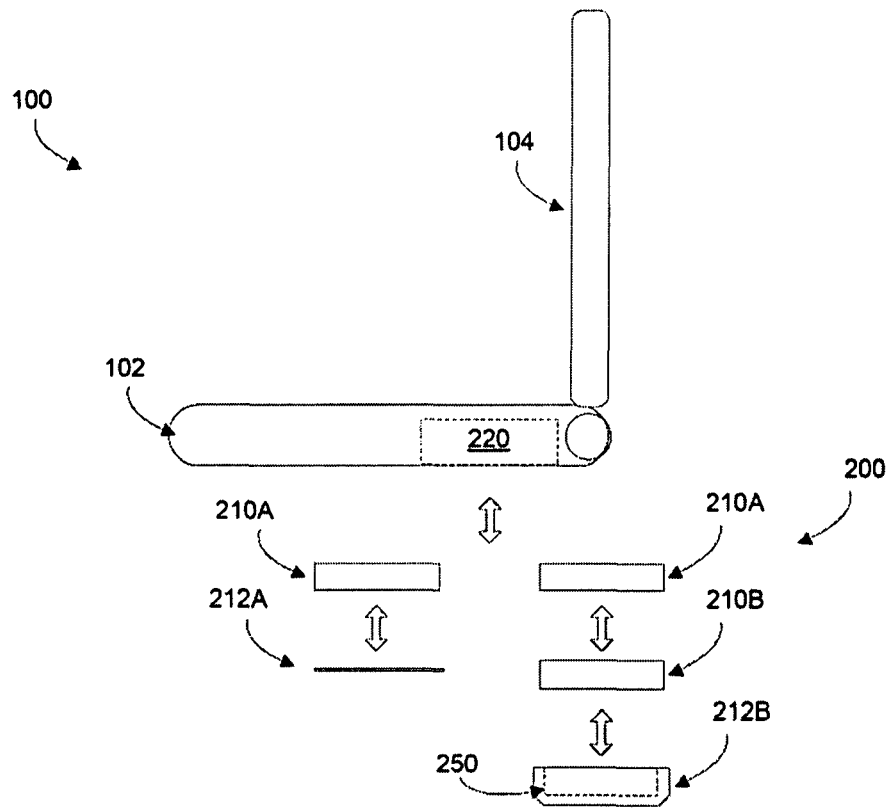
FIG. 2A is an exploded side view of the portable computing device showing connection/removal of an additional hard disk drive in accordance with an exemplary embodiment.

Turning now to FIGS. 2A-2D, the computer 100 includes multiple hard disk drives 200. The computer 100 connects to a first HDD and then to one, two, or more additional HDDs. The base 102 is sized to receive and house plural HDDs. By way of example, FIG. 2A shows computer 100 connectable to either a single HDD 210A and cover 212A or two HDDs 210A, 210B and cover 212B. In one exemplary embodiment, each HDD is removable from the base 102 so a user can switch between a single HDD or plural HDDs.

Figure 2B:
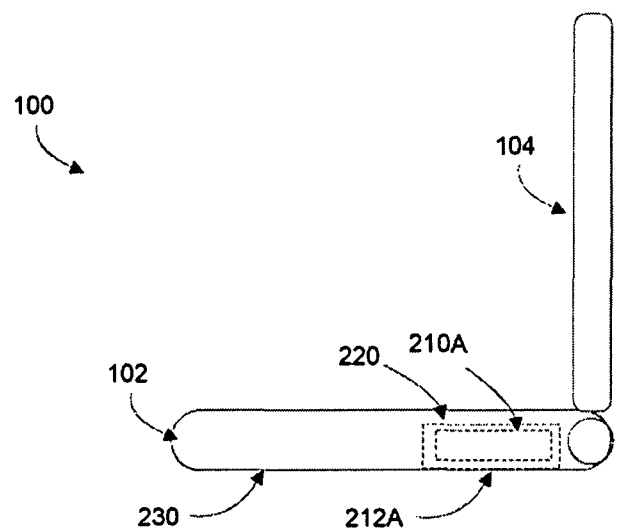
FIG. 2B is a side view of the portable computing device with one hard disk drive connected in accordance with an exemplary embodiment.

FIG. 2B shows the computer 100 with the single HDD 210A enclosed within and connected to the base 102. In this embodiment, the HDD 210A is inserted into a cavity or bay 220 located in the base 102. The cover 212A is flush with a bottom surface 230 of the base 102.

Figure 2C:
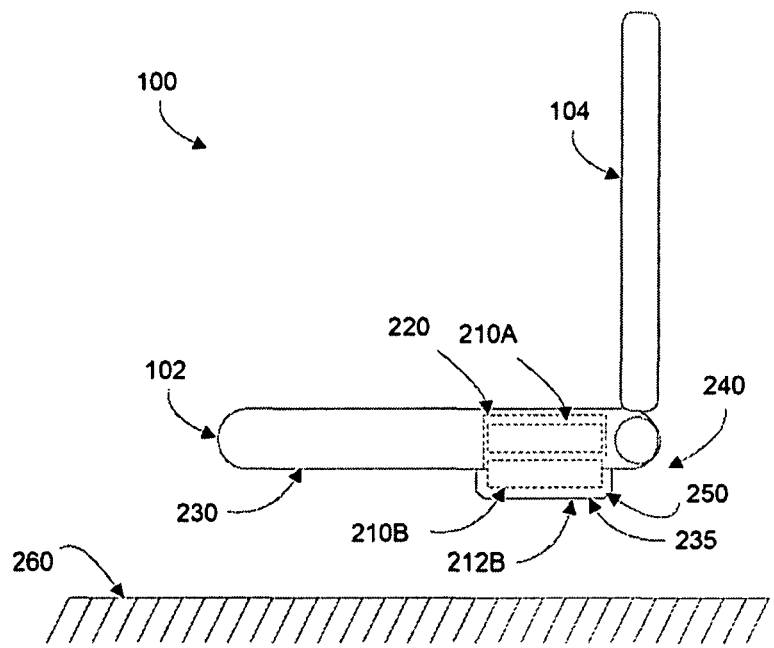
FIG. 2C is a side view of the portable computing device with plural hard disk drives connected in accordance with an exemplary embodiment.
Figure 2D:
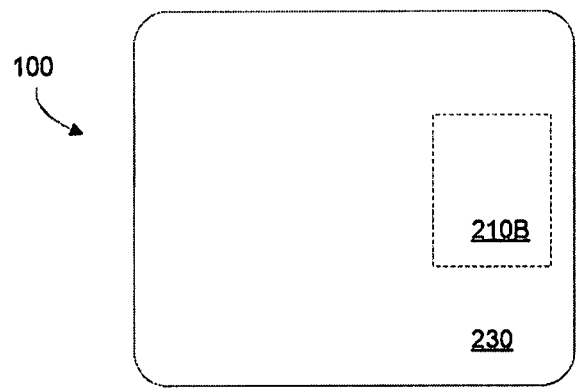
FIG. 2D is a bottom view of the portable computing device in accordance with an exemplary embodiment.

FIG. 2C shows the computer 100 with plural HDDs 210A, 210B enclosed within and connected to the base 102. In this embodiment, two HDDs 210A, 210C are inserted into the cavity or bay 220 located in the base 102. The cover 212B extends outwardly from the bottom surface 230 of the base 102 to form a foot pad or portion 235 that elevates, tilts, or angles one end 240 of the base 102 with respect to a support surface 260 upon which the bottom surface 230 rests or sits.

In one exemplary embodiment shown in FIGS. 2A-2D, the cover 212B includes a hollow portion or cavity 250 that is sized and shaped to receive the second HDD 212B. The cover has a semicircular or dome shape (in side view) for providing a foot rest for the computer 100. The cavity 250 is sized and shaped to receive and enclosed one or more HDDs.

Figure 3A:
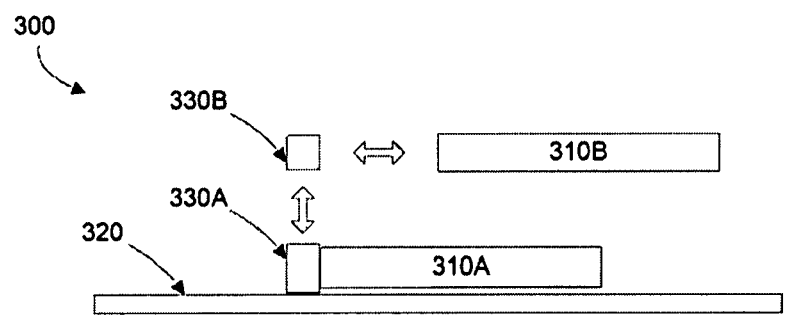
FIG. 3A is an exploded side view showing connection of an addition hard disk drive to a printed circuit board in accordance with an exemplary embodiment.
Figure 3B:
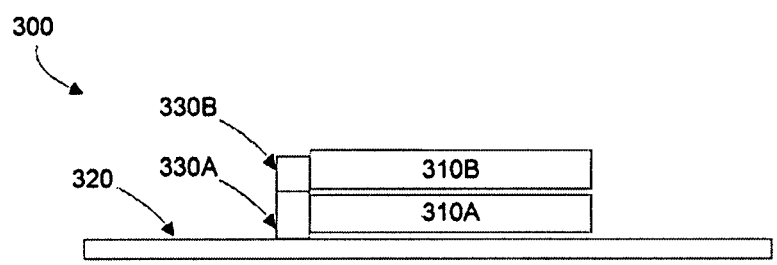
FIG. 3B is a side view showing the addition hard disk drive connected to the printed circuit board in accordance with an exemplary embodiment.

FIGS. 3A and 3B illustrate one exemplary embodiment wherein plural HDDs 300 are enclosed and housed within the base of the computing device. For illustration, two HDDs 310A, 310B connect to form a vertical stacked configuration. Specifically, the first HDD 310A connects to a PCB (printed circuit board) 320 (example, a motherboard) with a first connector 330A. The second HDD 310B connects to the PCB 320 via one end of the first connector 330A. As shown, the second HDD 310B is positioned on top of or vertically disposed adjacent to the first HDD 310A. Both HDDs 310A, 310B are enclosed within a housing of the computing device (example, see FIG. 2C).

In one exemplary embodiment, the first connector 330A is a bi-directional connector with one end connected (example, soldered) to the PCB 320 and a second end that is removably connectable with the second connector 330B. As another example, the second connector 330B is a right angle connector that removably connects to both the HDD 310B and first connector 330A.

Figure 4:
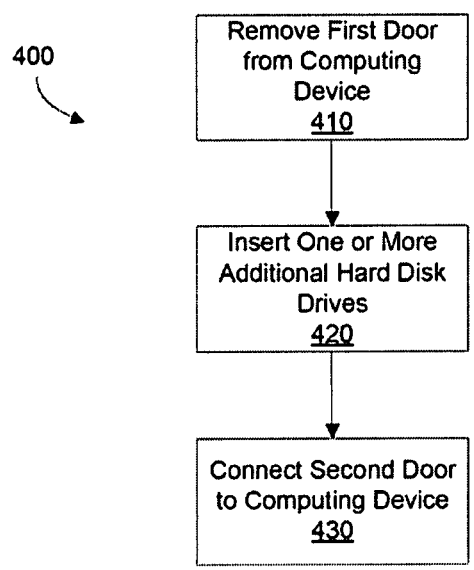
FIG. 4 is a flow diagram in accordance with an exemplary embodiment.

FIG. 4 is a flow diagram 400 in accordance with an exemplary embodiment for adding one or more additional hard disk drives to a computing device.

According to block 410, a user removes or opens a first door, panel, or other member in order to gain access to a cavity housing one or more HDDs in the computing device. By way of example, a user removes an access panel on a bottom surface of the computing device.

According to block 420, the user inserts and connects one or more additional HDDs to the computing device. By way of example, a second HDD is disposed adjacent to a first HDD included in the housing of the computing device. In one exemplary embodiment, the second HDD connects to the same connector used to connect to the first HDD to a PCB. In another embodiment, the second HDD connects to a different connector or connects directly to the PCB without connecting to the first connector.

According to block 430, the user connects a second door, panel, or other member to the computing device housing the plural HDDs. In one embodiment, the second panel is larger than the first panel and fits over and encloses both the first and second HDDs so both HDDs are enclosed within a body of the computing device.

In one exemplary embodiment an additional HDD is added inside the body of the computing device without changing or without substantially changing a size and shape (example, form factor) of the computing device. In one exemplary embodiment, a form factor of a computing device with two separate HDDs is similar or same to a form factor of a computing device with one of the two HDDs removed. For instance, FIG. 2B shows a side view of a computing device having a first form factor with a single HDD, and FIG. 2C shows a side view of the same computer device having a second form factor with two HDDs. The difference between the two form factors is the second form factor includes the raised, rounded foot portion 235. By way of example, in one embodiment, the foot portion 235 extends outwardly from the bottom surface 230 a distance approximately equal to a thickness of the second HDD 210B.

As used herein, a "connector" is any device that provides a conductive pathway for joining electrical circuits or components. The connectors are used, for example, to electrically couple one or more of HDDs and PCBs. In one exemplary embodiment, each connector includes one or more of a first socket (example, female) and a second socket (example, male). Further, one or more connectors are used to connect one or more of the plural HDDs to the computing device.

As used herein, the term "printed circuit board" means a device used to mechanically and/or electrically connect electronic components using conductive pathways or traces. As used herein a "motherboard" is a printed circuit board that is used in a computing device (such as a personal computer or other electronic device). The motherboard (also known as a main board or system board) provides attachment points for one or more of processors, graphics cards, sound cards, controllers, memory, integrated circuits (ICs), modules, PCBs, HDDs, connectors, and many other electronic components and devices in a computing system.

The methods in accordance with exemplary embodiments are provided as examples and should not be construed to limit other embodiments. For instance, blocks in diagrams or numbers (such as (1), (2), etc.) should not be construed as steps that must proceed in a particular order. Additional blocks/steps may be added, some blocks/steps removed, or the order of the blocks/steps altered and still be within the scope of the exemplary embodiments.

What is claimed is:

1. A computer, comprising:
a base including an opening formed therein;
a first hard disk drive (HDD) positioned in a housing of the base through the opening in a direction substantially perpendicular to a bottom surface of the base;
a first door that encloses the first HDD inside the housing of the base;
a second HDD separately positioned in the housing of the base through the opening in the direction substantially perpendicular to the bottom surface of the base after the first HDD is positioned in the housing of the base such that the computer includes both the first HDD and the second HDD; and
a second door that encloses the first and second HDDs inside the housing of the base,
wherein the first door connects to the housing when the computer includes the first HDD without the second HDD,
wherein the second door replaces the first door and connects to the housing when the computer includes both the first HDD and the second HDD, and
wherein the second door has a cavity shaped to receive the second HDD.

2. The computer of claim 1, wherein the second door protrudes outwardly from a bottom surface of the base to provide a foot for supporting the computer on a surface.

3. The computer of claim 1, wherein the second door has a different size and shape than the first door, and the first and second doors are removable such that the computer can switch between including a single HDD with the first door attached to the base and including two HDDs with the second door attached to the base.

4. The computer of claim 1 further comprising:
a printed circuit board (PCB) in the base; and
a connector to removably connect the second HDD to the PCB.

5. The computer of claim 1, wherein the first door is flush with a bottom surface of the base, and the second door extends outwardly from the bottom surface of the base a distance equal to a thickness of the second HDD.

6. The computer of claim 1, wherein a difference between a first form factor of the computer with the first HDD and the first door connected to the base and a second form factor of the computer with the first and second HDDs and the second door connected to the base includes only the second door extending outwardly from a bottom surface of the base.

7. The computer of claim 1, wherein the first HDD and the second HDD are vertically stacked in the housing of the base.

8. The computer of claim 1, wherein the second HDD is separately positioned in the housing of the base vertically adjacent the first HDD.

9. The computer of claim 1, wherein the first HDD and the second HDD are disposed vertically adjacent each other within a cavity of the base, and wherein a combined thickness of the first HDD and the second HDD when disposed vertically adjacent each other within the cavity is greater than a depth of the cavity.

10. The computer of claim 1, wherein the first door is substantially flat.

11. A computer, comprising:
   a base with a cavity open to a bottom surface of the base;
   a first hard disk drive (HDD) inserted into and removed from the cavity of the base in a direction substantially perpendicular to the bottom surface of the base;
   a second HDD inserted into and removed from the cavity of the base in the direction substantially perpendicular to the bottom surface of the base;
   a first cover removably connected to the base to cover the cavity and the first HDD when the first HDD is inserted into the cavity of the base in the direction substantially perpendicular to the bottom surface of the base and positioned in the cavity and the second HDD is removed from the cavity; and
   a second cover removably connected to the base to cover the cavity and the first HDD and the second HDD when the first HDD and the second HDD are inserted into the cavity of the base in the direction substantially perpendicular to the bottom surface of the base and positioned in the cavity,
   wherein the first HDD and the second HDD are vertically stacked within the cavity, and wherein a combined thickness of the first HDD and the second HDD when vertically stacked within the cavity is greater than a depth of the cavity.

12. The computer of claim 11, wherein the computer is a portable notebook computer.

13. The computer of claim 11, wherein the base includes a top surface opposite the bottom surface, and the top surface includes a keyboard.

14. The computer of claim 11, wherein the second HDD is separately positioned in the cavity of the base after the first HDD is positioned in the cavity of the base such that the computer includes both the first HDD and the second HDD.

15. The computer of claim 11, wherein the first cover is substantially flat.

16. The computer of claim 11, wherein the first cover is without a hollow portion to at least partially receive one of the first and second HDDs.

17. The computer of claim 11, wherein the second cover has a shape different than the first cover and includes a hollow portion to at least partially receive one of the first and second HDDs.

18. The computer of claim 11, wherein the second cover protrudes outwardly from a bottom surface of the base to elevate one end of the base while the computer is resting on a support surface.

19. The computer of claim 11, further comprising:
   a connector to removably connect the first HDD and the second HDD.

* * * * *